United States Patent Office 3,429,882
Patented Feb. 25, 1969

3,429,882
1,2,8,9-TETRAAZAPHENALENES
Karl J. Doebel, Ossining, and John E. Francis, Pleasantville, N.Y., assignors to Geigy Chemical Corporation, Ardsley, N.Y., a corporation of New York
No Drawing. Filed Mar. 25, 1968, Ser. No. 715,525
U.S. Cl. 260—250        15 Claims
Int. Cl. C07d *51/02;* A61k *27/00*

ABSTRACT OF THE DISCLOSURE 1,2,8,9-tetraazaphenalenes optionally substituted in the 4,5,6,7 and/or 9 positions and their salts are cardiovascular agents. Representative embodiments are 1,2,8,9-tetraazaphenalene, 9-methyl-1,2,8,9-tetraazaphenalene and 9-phenyl-1,2,8,9-tetraazaphenalene.

Cross reference

This is a continuation-in-part of copending applications Ser. Nos. 583,380, 539,305 and 445,762 filed Oct. 3, 1966, Apr. 1, 1966 and Apr. 5, 1965 respectively, Ser. No. 539,303 being a continuation-in-part of Ser. No. 445,762 and Ser. No. 583,980 being a continuation-in-part of Ser. Nos. 539,303 and 445,767.

Detailed description

The present invention pertains to 1,2,8,9-tetraazaphenalenes of the formula:

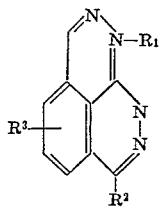

wherein $R^1$ is hydrogen, (lower)alkyl, phenyl or phenyl (lower)-alkyl,
$R^2$ is hydrogen or phenyl; and
$R^3$ is hydrogen, chloro, bromo, hydroxy, (lower)alkoxy, carboxy or nitro, and to the acid addition and quaternary salts thereof.

The term "alkyl" and derivations thereof such as "alkoxy" denotes a straight or branched hydrocarbon chain. When qualified by the designation (lower), such chain will contain up to and including 6 carbon atoms. Illustrative of such alkyl groups are methyl, ethyl, propyl, isopropyl, butyl, sec-butyl, t-butyl, pentyl, hexyl, and the like, while illustrative of such alkoxy groups are methoxy, ethoxy, propoxy, butoxy and the like.

The compounds of the present invention are identified herein as derviatives of the novel parent tricyclic nucleus 1,2,8,9-tetraazaphenalene which is assigned the following numbering

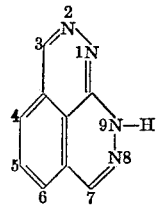

The 1,2,8,9-tetraazaphenalenes of the instant invention are cardiovascular agents, in particular, blood-pressure lowering agents. They also manifest coronary and peripheral vascular dilation properties, and effects on the central nervous system.

These compounds can be administered parenterally or orally in any of the usual pharmaceutical forms including tablets, capsules, powders, suspensions, solutions, syrups and the like, including sustained release preparations which can be compounded by any of the known procedures.

Preparation of the 1,2,8,9-tetraazaphenalenes can be accomplished in a number of ways. In a first embodiment, a 2,6-bis(dibromomethyl)benzoic acid of Formula II is treated with two or more molar equivalent amounts of hydrazine. This condensation is generally conducted at somewhat elevated temperatures optionally in the presence of a solvent, e.g., by refluxing an aqueous mixture of the reactants. This reaction may be represented as follows:

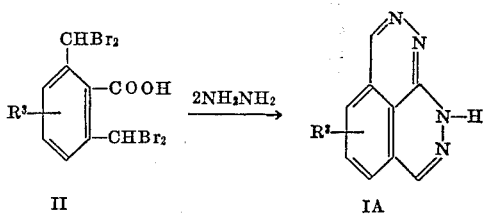

In a second embodiment, a 2-carbonyl-6-aldehydobenzoic acid of Formula III is treated with hydrazine under essentially the same conditions as described above:

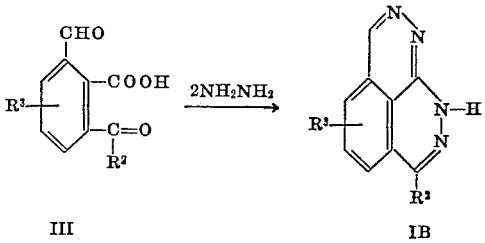

It is to be appreciated that the 2-carbonyl-6-aldehydobenzoic acid of Formula III is equivalent to its tautomeric 3-hydroxy-7-aldehydophthalide of Formula IV:

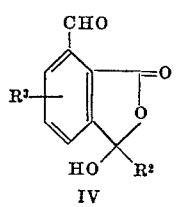

Both the 2,6-bis(dibromomethyl)benzoic acids of Formula II and the 2-carbonyl-6-aldehydobenzoic acids of Formula III wherein $R^2$ is hydrogen can be readily prepared from 2,6-dimethylbenzoic acids through photochemical bromination; e.g., reaction with four equivalents of bromine in carbon tetrachloride at reflux temperature and under the influence of light. Hydrolysis of the resultant 2,6-bis(dibromomethyl)benzoic acid with dilute aqueous base, followed by acid hydrolysis yields the 2,6-dialdehydobenzoic acid of Formula III ($R^2$=H).

The starting materials of Formula III wherein $R^2$ is phenyl; i.e., 2-benzoyl-6-aldehydobenzoic acids, are prepared via an initial Grignard reaction with a 3-methylphthalic anydride and isolation of the desired isomer, namely the 2-benzoyl-6-methylbenzoic acid. This is then brominated in a fashion analogous to that described above and the 2-benzoyl-6-dibromomethylbenzoic acid is then hydrolysed to yield the 2-benzoyl-6-aldehydobenzoic acid.

In a third embodiment of the present invention, either a compound of Formula II, Formula III or Formula IV is treated with a single molar equivalent of hydrazine to yield a hydrazone of the phthalazinone of Formula V. After isolation of this hydrazone, treatment with hot dimethylformamide, dimethylacetamide or additional hydrazine yields the 1,2,8,9-tetraazaphenalenes of Formula I wherein $R^1$ is hydrogen.

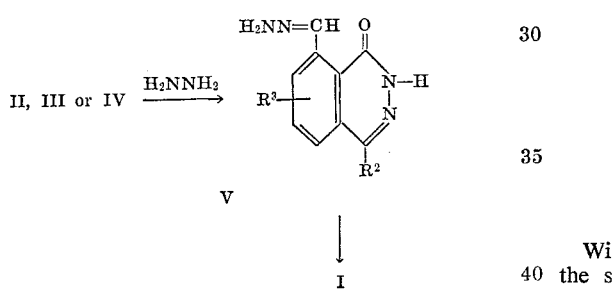

In the foregoing reaction sequence $R^2$ and $R^3$ are as previously defined.

In a fourth embodiment of the present invention, a 3 - thiono-2,3-dihydro - 1,2,8,9 - tetraazaphenalene of Formula VI is treated with Raney nickel in an inert organic solvent, such as methyl Cellosolve, to yield the corresponding 1,2,8,9 - tetraazaphenalenes of Formula I

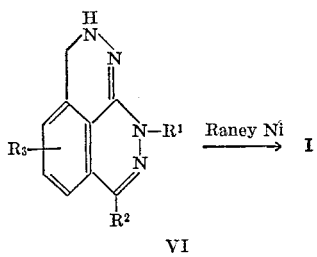

In a fifth embodiment, a 3-chloro- or 3-bromo-1,2,8,9-tetraazaphenalene is dehalogenated as with red phoshporus in hydriodic acid, platinum in ethanol or zinc dust in acetic acid.

As a sixth embodiment a 3-hydrazino - 1,2,8,9 - tetraphenalene is treated with dilute alkali in the presence of oxygen (or air), optionally in the presence of cupric ion.

The above mentioned 3-thiono-2,3 - dihydro-1,2,8,9-tetraazaphenalenes, 3-chloro- and 3-bromo-1,2,8,9-tetraazaphenalene and 3-hydrazino-1,2,8,9-tetraazaphenalenes are the subject of copending applications filed herewith.

Briefly, one preparation of such involves the following sequence:

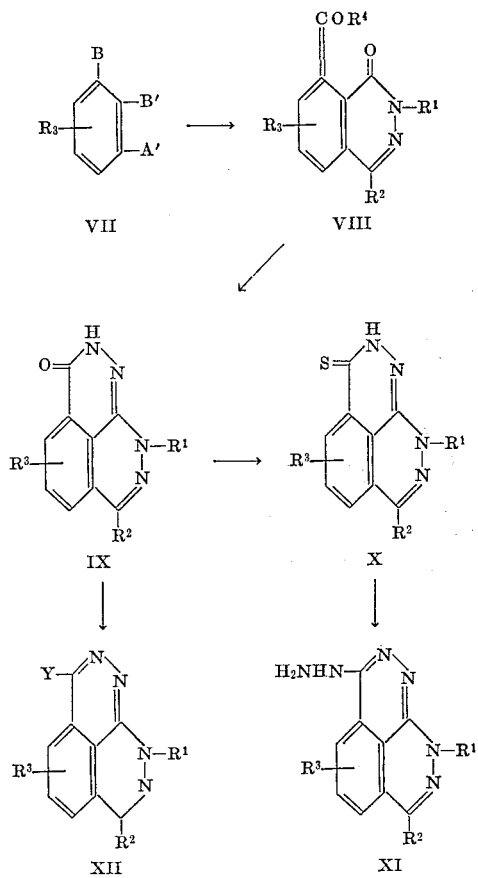

With greater particularity to the above reaction scheme, the starting material is a compound of Formula VII wherein $R^3$ is as previously defined, A' is dibromomethyl, an aldehyde group, or benzoyl and each of B and B' is a carboxyl group or a group the oxidative state of which corresponds to that of a carboxyl group including acid halides, anhydrides, esters and lactones thereof. Representative compounds of Formula VII thus includes 3-dibromomethylphthalic anhydride, 3 - hydroxy - 7-carboxyphthalide, 2-dibromomethyl - 6 - carbethoxybenzoic acid. A compound of Formula VII is then refluxed with hydrazine. There is thus obtained a substituted 1(2H)-phthalazinone of Formula VIII wherein $R^4$ is hydroxy, alkoxy, chloro or bromo, which, when treated with hydrazine yields the 3-keto - 2,3 - dihydro - 1,2,8,9-tetraazaphenalene of Formula IX. This may be converted directly to the 3-chloro- or 3-bromo-1,2,8,9-tetraazaphenalene of Formula XII wherein Y is chloro or bromo through the action of phosphorus pentachloride, phosphorus pentabromide, phosphorus oxychloride and the like. Alternatively the keto compound of Formula IX is treated with phosphorus pentasulfide in, for example, refluxing pyridine to yield the corresponding thiono derivative X, which when subjected to the action of hydrazine yields the 3-hydrazine-1,2,8,9-tetraazaphenalene XI.

Included within the scope of the present invention are the acid addition salts of these novel tetraazaphenalene derivatives, obtained via the conventional methods. Typical salts thus include those derived from hydrochloric, hydrobromic, sulfuric, phosphoric, methanesulfonic, acetic, lactic, succinic, embonic, malic, maleic, aconitic, phthalic, tartaric and the like acids. Quaternary salts derived from alkyl halides are also within the sope of this invention.

The following examples, presented for illustration and not limitation, will serve to further typify the nature of the present invention. In these examples temperature is expressed in degrees centrgrade.

EXAMPLE 1

1,2,8,9-tetraazaphenalene (a) 2,6-bis(dibromomethyl)benzoic acid.—A solution of 2,6-dimethylbenzoic acid (17 g.) in carbon tetrachloride (1200 ml.) is placed in a 3-necked flask with stirrer, dropping funnel and upright condenser leading to a dry wash bottle followed by a wash bottle containing water. The solution is heated to reflux and illuminated with a 250 watt tungsten lamp. Bromine (75 g.) in carbon tetrachloride (350 ml.) is added dropwise over 30 minutes, maintaining vigorous reflux. Stirring and heating are continued until the evolution of hydrogen bromide ceases. The mixture is cooled, filtered and the precipitate washed several times with carbon tetrachloride to yield the product, M.P. 203–206° C.

*Analysis.*—Calcd.: C, 23.21; H, 1.30; Br, 68.64. Found: C, 23.49; H, 1.07; Br, 69.69.

(b) 3 - hydroxy - 7 - aldehydophthalide.—2,6-bis-(dibromomethyl)benzoic acid (37.2 g.) is added in small portions to a stirred solution of 5% sodium carbonate (600 ml.). The mixture is heated on a steam bath until a clear solution is obtained and then acidified under cooling with concentrated hydrochloric acid. The white precipitate which forms (9.12 g.) can be shown by analysis and infrared spectroscopy to be predominantly 3-hydroxy-7-aldehydophthalide. The aqueous mother liquor is extracted continuously with chloroform for 24 hours. Evaporation of the chloroform yields 2.57 g. of semi-solid containing the same material. When a portion of the first crop is recrystallized from benzenehexane, a colorless solid is obtained, the melting point of which (127–133° C.) is not changed by further crystallizations.

*Analysis.*—Calcd.: C, 60.67; H, 3.40. Found: C, 60.62; H, 3.25.

(c) 1,2,8,9 - tetraazaphenalene.—3 - hydroxy-7-aldehydophthalide (11.7 g.) is suspended in water (390 ml.) and added slowly to a stirred solution of 100% hydrazine hydrate (47 ml.). A pale yellow solid which forms initially disappears when the solution is heated to reflux under stirring. After 66 hours at reflux the slightly turbid yellow solution is treated with decolorizing carbon, filtered hot and allowed to cool in a refrigerator. The product, 1,2,8,9-tetraazaphenalene, precipitates in hair-like yellow needles, M.P. 287–293° C., in a yield of 55%. Recrystalization from water, followed by absolute ethanol and again from water yields the analytically pure material, which sublimes at about 190–240° C. and decomposes at 294–298° C.

*Analysis.*—Calcd.: C, 63.51; H, 3.56; N, 32.94. Found: C, 63.69; H, 3.68; N, 32.78.

Treatment of the crystalline material, M.P. 127–133° C., with aqueous hydrazine under the same conditions also yields 1,2,8,9-tetraazaphenalene.

EXAMPLE 2

1,2,8,9-tetraazaphenalene (a) 8 - aldehydo - 1(2H)phthalazinone hydrazone.—3-hydroxy-7-aldehydophthalide (6.0 g.) is added to a stirred solution of 100% hydrazine hydrate (100 cc.) and heated under reflux for 30 minutes. The hot solution is filtered free of a small amount of insoluble material and allowed to cool overnight in the refrigerator. The yellow crystals are washed with water and dried in vacuo at 40° for 66 hours. The material (3.25 g.) shows a single spot in TLC examination and is analytically pure. A small portion is sublimed at 120°/0.05 mm. unchanged. The melting point of the sublimed and unsublimed material is 235–237°.

*Analysis.*—Calculated: C, 57.43; H, 4.29; N, 29.77. Found: C, 57.28; H, 4.23; N, 30.04.

(b) 1,2,8,9-tetraazaphenalene.—To a solution of 100% hydrazine hydrate (10 ml.) in water (100 ml.) is added 8-aldehydo-1(2H)phthalazinone hydrazone (0.94 g.) and this mixture is stirred 24 hours at reflux. The yellow solution is then filtered hot and then refrigerated. The yellow crystals which precipitate are collected, washed with water and dried. The product (0.70 g.) is recrystallized from ethanol to give 0.50 g. of golden yellow solid, the infrared spectrum and melting point of which are identical to those of 1,2,8,9-tetraazaphenalene.

EXAMPLE 3

1,2,8,9-tetraazaphenalene (a) 3-(dibromomethyl)phthalic anhydric.—A mixture of 3-methylphthalic anhydride (81 g.), N-bromosuccinimide (182 g.), benzoyl peroxide (40 mg.) and carbon tetrachloride (1500 ml.) is irradiated and heated to a reflux by a 100 watt insertion-type ultraviolet lamp under stirring and exclusion of moisture. After the mixture becomes brick red, an additional 40 mg. of benzoyl peroxide are added. Illumination at reflux is carried out during 24 hours. The mixture is cooled and filtered free of succinimide and the filtrate is evaporated in vacuo. The residual yellowish brown solid is dissolved in hot ether, treated with decolorizing charcoal and filtered. Addition of hexane to the filtrate affords the crystalline product, M.P. 90.5–93° C. in 72% yield. The recrystallization from ether-hexane yield colorless needles melting at 93–

*Analysis.*—Calculated for $C_9H_4Br_2O_3$: C, 33.78; H, 1.26; Br, 49.92. Found C, 33.66; H, 1.20; Br, 49.41.

(b) 3 - keto - 2,3-dihydro-1,2,8,9-tetraazaphenalene.—A suspension of 3-(dibromomethyl)phthalic anhydride (80 g.) in ethanol (500 cc.) is treated with 100% hydrazine hydrate (100 cc.) and water (100 cc.) dropwise under stirring and cooling. After the addition, the temperature is raised gradually to reflux. After 88 hours at reflux, the mixture is cooled, filtered and the solid is washed with water and ethanol and dried in vacuo. The mother liquors are evaporated in vacuo, dissolved in 500 ml. of glacial acetic acid and heated at reflux for 18 hours. The mixture is cooled and filtered and a second crop is obtained. The overall yield of product, M.P. 347°, is 25.7 g. The product is recrystallized from 3 liters of boiling dimethylformamide and obtained as a yellow powder which, on heating, forms a microcrystalline solid at 220–227° C. and melts above 350° C.

*Analysis.*—Calcd.: C, 58.06; H, 3.25; N, 30.09; Found: C, 57.92, 58.03; H, 3.58, 3.52; N, 30.28.

A higher yield of product is obtained with hydrazine hydrate in methyl-Cellosolve at reflux for about 48 hours.

(c) 3 - thiono-2,3-dihydro-1,2,8,9-tetraazaphenalene.—A mixture of 3-keto-2,3-dihydro-1,2,8,9-tetraazaphenalene (44.14 g.) phosphorous pentasulfide (58.2 g.) and dry pyridine (356 ml.) is heated under reflux for 2.5 hours under stirring and exclusion of moisture. The dark red solution is cooled and poured under stirring into one liter of ice-cold saturated salt solution. The mixture is stirred for 1½ hours and then filtered. The precipitate is washed thoroughly with water and dried at 100° C. in vacuo. The orange solid (35.0 g., M.P. 298–320° dec.) is recrystallized once from methyl-Cellosolve/water (removing a small amount of insoluble solid) and once from dimethylformamide-water, M.P. 318–322° on a block preheated to 250°.

*Analysis.*—Calcd.: C. 53.45; H, 2.99; N, 27.71. Found: C, 53.31, 53.37; H, 3.00, 3.00; N, 27.85.

(d) 1,2,8,9 - tetraazaphenalene.—3 - thiono - 2,3 - dihydro-1,2,8,9-tetraazaphenalene (4.04 g.) is suspended in methyl Cellosolve (200 ml.) and ethanol (200 ml.) and treated with Raney nickel (about 20 g.). The mixture is heated for four hours on a steam bath, filtered hot and the filtrate allowed to cool. A small amount of starting material precipitates and is filtered off. The filtrate is evaporated to dryness, taken up in boiling ethanol (500 ml.), filtered free of more starting material and again evaporated. The residue is taken up in hot water (800 ml.), cooled, filtered free of starting material and evaporated to dryness in vacuo to yield the product, physical constants as above.

EXAMPLE 4

9-methyl-1,2,8,9-tetraazaphenalene (a) 3-keto-9-methyl-1,2,8,9 - tetraazaphenalene.—To a stirred suspension of sodium methoxide (0.07 g.) in dry dimethylsulfoxide (100 ml.) is added 3-keto-2,3-dihydro-1,2,8,9-tetraazaphenalene (1.86 g.). This is stirred at 60° under moisture exclusion until a red solution has formed. This is cooled to 50° C. and methyliodide (1 ml.) added. The solution darkens, and after 20 minutes, more methyyliodide (1 ml.) is added and the solution stirred for 125 minutes at 50–60° C. The dark solution is poured into ice water (500 ml.) containing 0.5 g. of sodium bisulfite and 4 ml. of glacial acetic acid. The mixture is cooled overnight and then filtered. The product is collected by filtration, washed with water and dried. The yellow solid product (1.2 g.) is twice recrystallized from methyl Cellosolve with the aid of decolorizing charcoal.

(b) 3 - thiono - 9 - methyl - 2,3 - dihydro - 1,2,8,9-tetraazaphenalene.—3 - keto - 9 - methyl - 2,3 - dihydro-1,2,8,9-tetraazaphenalene (9.0 g.) is dissolved in dry pyridine (120 ml.) and phosphorus pentasulfide (12 g.) is added with stirring. The mixture is refluxed under moisture exclusion for 2½ hours, poured into an ice-salt mixture and stirred for 30 minutes. The yellow solid which forms is collected, washed with water, dried as well as possible in vacuo, and recrystallized from methyl Cellosolve to yield 5.42 g. of the product as yellow crystals. Two recrystallizations from methyl Cellosolve gives the product which decomposes in the range 299° to 316°.

Calcd. for $C_{10}H_8N_4S$: C, 55.53; H, 3.73; N, 25.91; S, 14.83. Found: C, 55.40; H, 3.82; N, 26.06; S, 14.72.

(c) 9 - methyl - 1,2,8,9 - tetraazaphenalene.—3 - thiono-9-methyl-1,3-dihydro-1,2,8,9-tetraazaphenalene (1.08 g.) is suspended in ethanol (200 ml.) and treated with Raney nickel (about 5 g.) in ethanol little by little. After addition is complete, the mixture is stirred for one hour on the steam bath and then filtered hot. The filtrate is evaporated in vacuo, taken up in ethanol and again filtered to remove nickel. Evaporation of the ethanol solution yields a yellow solid (0.60 g.). The product is purified by one recrystallization from benzene-hexane. Yellow crystals (0.40 g.) are obtained melting in the range 145–147°.

Calcd. for $C_{10}H_8N_4$: C, 65.20; H, 4.38; N, 30.42. Found: C, 65.03; H, 4.59; N, 30.15.

EXAMPLE 5

9-methyl-1,2,8,9-tetraazaphenalene (a) 3-chloro-9-methyl-1,2,8,9-tetraazaphenalene.—To a stirred mixture of phosphorus pentachloride (11.25 g.) in phosphorus oxychloride (90 ml.) is added 3-keto-9-methyl-2,3-dihydro-1,2,8,9-tetraazaphenalene and the mixture stirred at reflux under moisture exclusion for 2 hours. A thick yellow precipitate forms. The mixture is poured into ice and basified under stirring and cooling with 20% sodium hydroxide solution. The yellow solid is collected, washed thoroughly with water and dried in a desiccator over phosphorus pentoxide. The crude material (8.63 g.) is twice recrystallized from ethanol, charcoal being used in the first recrystallization, and 4.75 g. of the pure product (M.P. 253–255° dec.) are obtained.

(b) 9-methyl-1,2,8,9-tetraazaphenalene.—A mixture of powdered red phosphorus (10 g.), 47% hydriodic acid (150 ml.) and 3-chloro-9-methyl-1,2,8,9-tetraazaphenalene (10.8 g.) is heated for 20 hours at reflux. The mixture is poured into ice water, filtered and the filtrate evaporated to a small volume. The solution is rendered basic with 5% sodium carbonate solution and extracted with chloroform. The chloroform solution is dried over sodium sulfate and evaporated in vacuo. The yellow residue (7.5 g.) is chromatographed over 300 g. of Woelm neutral alumina, grade II, with chloroform as eluent. After a 250 ml. forerun, a 1500 ml. portion of eluent yields 5.2 g. of yellow solid, M.P. 149–151°. The melting point is unchanged after recrystallization from benzene-hexane and the infrared spectrum is identical to that of the product obtained from 9-methyl-3-thiono-2,3-dihydro-1,2,8,9-tetraazaphenalene according to Example 4.

EXAMPLE 6

1,2,8,9-tetraazaphenalene (a) 3-hydrazino-1,2,8,9-tetraazaphenalene dihydrochloride.—A mixture of 3-thiono-2,3-dihydro-1,2,8,9-tetraazaphenalene (30 g.) and 85% hydrazine hydrate (500 ml.) is refluxed under vigorous stirring for 20 hours. The mixture is cooled, filtered and the yellow precipitate washed with water and dried in vacuo. The yield of free base is 21.0 g. (70%). The crude base is suspended in excess 3 N hydrochloric acid, filtered free of residual solid and evaporated in vacuo. The residue is triturated with methanol and filtered. The crude dihydrochloride (20.7 g.) is recrystallized by dissolution in water followed by addition of methanol and concentrated hydrochloric acid. A further recrystallization from water-concentrated hydrochloric acid yields an analytical sample, M.P. 245–248° C. (dec.), on slow heating.

Analysis.—Calcd.: C, 39.57; H, 3.69; N, 30.77; Cl, 25.97. Found: C, 39.68; H, 4.34; N, 30.78; Cl, 25.65.

(b) 1,2,8,9 - tetraazaphenalene.—3 - hydrazino - 1,2,8,9-tetraazaphenalene dihydrochloride (28.7 g.) is dissolved in water (800 ml.) and treated with 10% aqueous cupric sulphate solution (400 ml.). The suspension is heated on the steam bath for 1 hour, during which time bubbles evolve from the mixture. The mixture is cooled and rendered strongly basic with 20% sodium hydroxide solution and filtered. The dark precipitate is dissolved in two liters of 6 N hydrochloric acid, filtered and the filtrate evaporated to dryness in vacuo. The black residue is suspended in methanol and filtered. The precipitate (17.5 g.) is collected and addition of ether to the filtrate gives a second crop of solid (7.7 g.). The combined material is suspended in water containing a little hydrochloric acid and treated with gaseous hydrogen sulfide until saturation. The mixture is then filtered free of copper sulfide and the yellow filtrate evaporated to dryness in vacuo. The resulting residue is triturated with acetone, and collected by filtration to give 9.37 g. of 1,2,8,9-tetraazaphenalene hydrochloride. The hydrochloride salt is suspended in 5% sodium carbonate (500 ml.) and the yellow solid collected an dried, infrared spectrum and melting points as above.

EXAMPLE 7

9-phenyl-1,2,8,9-tetraazaphenalene (a) 3 - hydroxy - 7 - carboxyphthalide.—3 - (dibromomethyl)-phthalic anhydride (40 g.) is added in small portions to hot solution of 2 N sodium hydroxide (500 ml.) with stirring. After ten minutes, the clear solution is rendered strongly acidic with concentrated hydrochloric acid and heated for one-half hour at 80°. The solution is evaporated to dryness in vacuo and the residue is dissolved in hot water (600 ml.) treated with decolorizing charcoal and filtered. Aftre three days at 5° C., the colorless filtrate yields 21.3 g. (88%) of colorless blocks, M.P. 163.5–166° C. An analytical sample, M.P. 165.5–168.5° C., is obtained by two crystallizations from water.

Analysis.—Calcd. for $C_9H_6O_5$: C, 55.68; H, 3.12. Found: C, 55.98; H, 2.99.

(b) 2-phenyl-8-carboxy-1(2H)phthalazinone.—A mixture of phenylhydrazine (3.6 ml.), 3-hydroxy-7-carboxyphthalide (5.82 g.) and glacial acetic acid (100 ml.) is heated under reflux for 18 hours. The clear solution is evaporated to dryness in vacuo and the residual solid triturated with methanol and collected. The product (6.97 g.), M.P. 197–199°, is recrystallized from benzene and a colorless crystalline product, M.P. 197–198°, obtained.

Calcd. for $C_{15}H_{10}N_2O_3$: C, 67.66; H, 3.79; N, 19.52. Found: C, 67.28; H, 3.75; N, 10.82.

The infrared spectrum (Nujol) shows prominent peaks at 1720 cm.$^{-1}$ (carboxyl group) and 1650 cm.$^{-1}$ (amide carbonyl).

(c) 8-carbethoxy-2-phenyl-1(2H)phthalazinone.—To a solution of thionyl chloride (40 ml.) in chlorobenzene (150 ml.) is added with stirring 8-carboxy-2-phenyl-1(2H)-phthalazinone (24.3 g.) and this mixture is heated at reflux under moisture exclusion for 2 hours. When the evolution of gas has ceased, the solution is evaporated to dryness in vacuo. The residual white solid (24.7 g.) is treated with absolute ethanol (350 ml.) and heated under reflux for 18 hours. The solution is filtered hot and allowed to cool slowly. The ester precipitates in colorless needles, M.P. 150–151°. Recrystallization from ethanol does not change of the melting point.

Calculated for $C_{17}H_{14}N_2O_3$: C, 69.37; H, 4.79; N, 9.52. Found: C, 69.08; H, 4.65; N, 9.36.

(d) 3 - keto - 9 - phenyl - 2,3 - dihydro - 1,2,8,9 - tetraazaphenalene.—A mixture of 2-phenyl-8-carbethoxy-1(2H)phthalazinone (11.76 g.), 100% hydrazine hydrate (40 ml.) and methyl Cellosolve (160 ml.) is heated at reflux for 25 hours. The yellow solution is filtered and treated with methanol (100 ml.) followed by water dropwise under stirring. A flocculent yellow precipitate forms. The mixture is cooled and the product collected, washed thoroughly with water and ethanol and dried in vacuo. The solid (4.44 g.), M.P. 254–6°, is recrystallized from methyl Cellosolve and obtained as yellow needles, M.P. 255–7°.

Calcd. for $C_{15}H_{10}N_4O$: C, 68.70; H, 3.85; N, 21.37. Found: C, 68.81; H, 3.90; N, 21.20.

(e) 3-chloro-9-phenyl-1,2,8,9-tetraazaphenalene.—To a stirred mixture of phosphorus pentachloride (6.3 g.) in phosphorus oxychloride (40 ml.) is added finely powdered 3 - keto - 9 - phenyl - 2,3 - dihydro - 1,2,8,9 - tetraazaphenalene (7.8 g.). The mixture is stirred at reflux for 165 minutes under moisture exclusion and then poured cautiously into ice. The mixture is rendered alkaline with cooling by the addition of 20% sodium hydroxide solution and the fine yellow precipitate which forms is collected and washed with water. This material is stirred for ½ hour in 600 ml. of warm (50°) water and again filtered. The precipitate is recrystallized from ethanol and 5.4 g. of yellow crystals, M.P. 225–228°, obtained. The infrared spectrum shows no trace of carbonyl absorption as seen in the starting material.

Analysis.—Calcd. for $C_{15}H_{19}ClN_4$: C, 64.18; H, 3.24; N, 19.96; Cl, 12.63. Found: C, 64.21; H, 3.08; N, 19.70; Cl, 12.67.

(f) 9 - phenyl - 1,2,8,9 - tetraazaphenalene.—Powdered amorphous red phosphorus (6.5 g.) is suspended in 47% hydriodic acid (65 ml.) and to this is added 3-chloro-9-phenyl-1,2,8,9-tetraazaphenalene (9.0 g.). The mixture is stirred at reflux for 18 hours and then poured into ice-water and filtered. The filtrate is rendered basic with 5% sodium carbonate and extracted with chloroform. The chloroform extracts are dried over sodium sulfate and evaporated in vacuo. The residual solid (6.5 g.) is recrystallized from benzene with the aid of decolorizing charcoal. A first crop of 3.1 g. of yellow crystals is obtained. Addition of hexane to the mother liquor causes precipitation of a second crop of solid (0.7 g.). The crops are combined and recrystallized from benzene. The pure product (2.87 g.) is thus obtained in yellow needles melting in the range 168.5° to 170°.

EXAMPLE 8

1,2,8,9-tetraazaphenalene

To a stirred solution of 100% hydrazine hydrate (20 ml.) in water (180 ml.) is added in small portions 2,6-bis(dibromomethyl)benzoic acid (9.3 g.). The mixture is heated under reflux for 95 hours, treated with decolorizing carbon and filtered hot. On cooling, pale yellow needles crystallize from the filtrate. These are collected, washed with water and dried over phosphorus pentoxide to give 2.17 g. of 1,2,8,9-tetraazaphenalene, constants as above.

EXAMPLE 9

5-methoxy-1,2,8,9-tetraazaphenalene (a) 4 -methoxy-2,6-bis(dibromomethyl)benzoic acid.—4-methoxy 2,6-dimethylbenzoic acid is dissolved in carbon tetrachloride (450 ml.) in a 3-necked flask equipped with mechanical sealed stirrer, reflux condenser and dropping funnel. The solution is heated to near reflux and illuminated with a 250 watt tungsten lamp as bromine (22.4 g., 7.5 ml.) in carbon tetrachloride (100 ml.) is added dropwise. Reflux is maintained for 2½ hours after completion of the addition, during which time a white precipitate forms. The mixture is cooled and filtered and the precipitate washed with a little carbon tetrachloride. The yield of pure white solid, M.P. 196–197°, is 15.68 g. or 90% of theory. A recrystallized (benzene) sample, M.P. 201–202° afforded the following analysis:

Calcd. for $C_{10}H_8O_3Br_4$: C, 24.22; H, 1.62; Br, 64.48. Found: C, 24.27; H, 1.65; Br, 64.98.

(b) 3-hydroxy - 5 - methoxy-7-aldehydophthalide.—4-methoxy-2,6-bis(dibromomethyl)benzoic acid (99.2 g.) is added to 5% sodium carbonate solution (1500 ml.) and the mixture heated on the steam bath under magnetic stirring. The resulting yellow solution is filtered hot, allowed to cool and acidified with 6 N hydrochloric acid. A white precipitate which forms weighs 12.56 g. and melts at 164–166°. The mother liquor is extracted continuously with chloroform overnight. Evaporation of the chloroform yields an additional 2.5 g. of material. The total yield of material (15.06 g.) is 36% of theory. Recrystallization from benzene raises the melting point to 174–175°.

Calcd. for $C_{10}H_8O_5$: C, 57.69; H, 3.88. Found: C, 57.93; H, 3.59.

(c) 5-methoxy-1,2,8,9-tetraazaphenalene.—3-hydroxy-5-methoxy-7-aldehydophthalide (10.4 g.) is suspended in water (1200 ml.) and treated with 100% hydrazine hydrate (120 ml.). The resulting yellow solution is heated under reflux for 116 hours. The hot solution is filtered, and the filtrate allowed to cool. A yellow precipitate (5.4 g.) is collected, and is triturated twice with hot ethyl acetate. The residual solid (3.6 g.) is recrystallized from ethanol (800 ml.) containing ethyl acetate (50 ml.) The product is dried in vacuo at 80° for 16 hours. The yield of pale yellow crystals, M.P. 291–294° is 1.55 g. or 15.5% of theory.

Calcd. C, 59.99; H, 4.02; N, 27.99. Found: C, 59.91; H, 4.23; N, 27.76.

EXAMPLE 10

5-bromo-1,2,8,9-tetraazaphenalene (a) 4 - bromo-2,6-bis(dibromomethyl)benzoic acid.—4-bromo-2,6-dimethylbenzoic acid (2.29 g.) is suspended in carbon tetrachloride (120 ml.) and stirred at reflux under illumination from a 250 watt tungsten lamp. Bromine (6.4 g.) in carbon tetrachloride (300 ml.) is added dropwise over a 20 minute period. After a further 15 minutes, a white precipitate begins to appear. The mixture is stirred at reflux under illumination for three additional hours and then cooled and filtered. The product is washed with a little carbon tetrachloride and air dried. The yield of white solid, M.P. 219–221°, is 4.8 g., or 88% of theory. A sample recrystallized from benzene melts at 220–221°.

Calcd. for $C_9H_5Br_5O_2$: C, 19.84; H, 0.92; Br, 73.35. Found: C, 19.95; H, 0.71; Br, 73.43.

(b) 3 - hydroxy-5-bromo-7-aldehydophthalide.—To a 5% solution of sodium carbonate in water (160 ml.) is added under stirring 4-bromo-2,6-bis(dibromomethyl)benzoic acid (10.9 g.) and this solution is heated one-half hour on a steam bath. A transient white precipitate appears during the heating process. The solution is filtered hot and then cooled and acidified with 6 N hydrochloric acid. The solid is collected, washed with water and dried in vacuo. The white product (1.66 g.), M.P. 187–189°, may be used without further purification. Continuous chloroform extraction of the mother liquor over 24 hours yields an additional 0.54 g. of material.

(c) 5-bromo-1,2,8,9-tetraazaphenalene.—To a solution of 100% hydrazine hydrate (150 ml.) in water (1500 ml.) is added 3-hydroxy-5-bromo-7-aldehydrophthalide (8.0 g.). The mixture is stirred at reflux for 144 hours, then cooled and filtered. The yellow precipitate (4.8 g.) is dissolved as well as possible in hot glacial acetic acid (250 ml.), filtered and the filtrate treated with 5% sodium carbonate until neutral. The product is collected, washed with water and dissolved as well as possible in 6 N hydrochloric acid (600 ml.). Filtration through sintered glass removes most of the impurity. The filtrate is evaporated to dryness, triturated with acetone and the precipitate collected. The solid (2.3 g.) is suspended in warm water (400 ml.) and the solution neutralized with 5% sodium carbonate. The precipitate is collected, washed with water and acetone, and dried. This material (1.85 g.) contains a trace of impurity and is again purified via hydrochloride formation as above. The resulting material (1.45 g.) is recrystallized from a mixture of dimethylformamide (500 ml.) and ethanol (1 liter). The pure product (1.03 g.) is thus obtained in golden yellow plates, M.P. >350°.

Calcd. C, 43.41; H, 2.02; N, 22.49; Br, 32.08. Found: C, 43.52; H, 2.32; N, 22.56; Br, 31.95.

EXAMPLE 11

5-carboxy-1,2,8,9-tetraazaphenalene (a) Methyl 4-carboxy-2,6-bis(dibromomethyl)benzoate.—Methyl-4-carboxy-2,6-dimethylbenzoate (10.4 g.) is dissolved in hot carbon tetrachloride (700 ml.) and with stirring and irradiation with a 250 watt tungsten lamp, treated dropwise with bromine (11 ml.) in carbon tetrachloride (75 ml.). The mixture is stirred at reflux an additional 4 hours, cooled and filtered. The precipitate is twice recrystallized from benzene-hexane to yield the product as glistening white needles, M.P. 211.5–213°.

(b) 5 - carboxy-1,2,8,9-tetraazaphenalene.—Methyl 4-carboxy-2,6-bis(dibromomethyl)benzoate (10.48 g.) is suspended in 5% aqueous sodium carbonate (150 ml.) and heated on the steam bath for 60 minutes. The mixture is filtered hot and filterate cooled and acidified with hydrochloric acid. The acidic solution is evaporated in vacuo to half its original volume and extracted continuously with the chloroform for 24 hours. Concentration of the chloroform extract yields a white solid intermediate which is used without further purification. This product (1.3 g.) is suspended in a solution of 100% hydrazine hydrate (15 ml.) and water (150 ml.) and heated at reflux for 173 hours. The yellow solution is filtered hot, cooled and acidified with glacial acetic acid. The product which precipitates (1.16 g.) is collected and dissolved in 5% sodium carbonate (100 ml.) and filtered through sintered glass. The filtrate is acidified with glacial acetic acid and the solid which forms is collected, washed thoroughly with water and air dried. The product is obtained as a white solid, M.P.>340°. The NMR spectrum is in agreement with the assigned structure. In a deuterium oxide-sodium deuteroxide mixture, the spectrum shows two peaks of equal intensity, one at 6.90δ corresponding to protons at positions 4 and 6 and a second at 7.72δ corresponding to protons at positions 3 and 7.

Calcd. for $C_{10}H_6N_4O_2 \cdot H_2O$: N, 23.15. Found: N, 22.93.

EXAMPLE 12

4,6,1-dinitro-1,2,8,9-tetraazaphenalene

To a stirred concentrated sulphuric acid (30 ml.) at 10° is added dropwise under cooling 90% nitric acid (30 ml.). 1,2,8,9-tetraazaphenalene (5.1 g.) is added little by little under stirring at such a rate that the temperature is maintained at 15–20° C. and then poured into ice-water (500 ml.). The acidic mixture (pH 1) is filtered through sintered glass to remove a small amount of orange solid. The filtrate is brought to pH 7 to 8 by addition of 20% sodium hydroxide solution under stirring and cooling, whereupon the solution changes from orange to deep red and a red precipitate emerges. The solid is collected and washed with water brought to pH 7 with a few drops of ammonium hydroxide. This material (4.77 g.) is dissolved in warm (60°) water (1000 ml.), filtered free of a little impurity and acidified with glacial acetic acid (100 ml.). An orange precipitate forms. The mixture is cooled overnight and filtered and the precipitate washed with water. The crude product (3.05 g.) is recrystallized twice from dimethylformamide-water to yield 1.4 g. of orange crystals.

TLC in glacial acetic acid, $rf=0.7$.

NMR (DMSO=$d_6$): 9.24δ singlet, area 1 (proton at $C_5$); 9.50δ, singlet, area 2 (protons at $C_2,C_7$); 10.10δ broad singlet, area 1 (proton at $N_1$).

Calcd.: C, 41.53; H, 1.55; N, 32.30. Found: C, 41.48; H, 180; N, 32.21.

EXAMPLE 13

7-phenyl-1,2,8,9-tetraazaphenalene (a) 3 - hydroxy-3-phenyl-7-dibromoethylphthalide.—3 - hydroxy - 3-phenyl-7-methylphthalide (2-benzoyl-6-methyl-benzoic acid, M.P. 124–6°) (2.4 g.) is suspended in carbon tetrachloride (200 ml.) in a 500 ml. 3-necked flask equipped with mechanical stirrer and two reflux condensers with drying tubes. A mixture of N-bromosuccinimide (3.5 g.) and benzoyl peroxide (0.1 g.) is added and the mixture stirred at reflux under illumination from a 250 watt tungsten lamp. After 3 hours, more benzoyl peroxide (0.05 g.) is added and the mixture stirred at reflux overnight. The mixture is filtered hot to remove most of the succinimide and the filtrate evaporate evaporated in vacuo. The brownish-white residue is recrystallized from benzene-hexane to yield 1.75 g. of buff-colored blocks. Recrystallization of this product from benzene-hexane raises the melting point to 166–170°, but the infrared spectrum is unchanged. Material once recrystallized is suitable for further reactions.

(b) 3 - hydroxy - 7-benzoylphthalide.—3-hydroxy-3-phenyl-7-dibromomethylphthalide (2.0 g.) is added to a stirred solution of 5% sodium carbonate (300 ml.) at about 80°. After one hour, the mixture is filtered hot and the clear filtrate cooled to 0–5° C. and acidified with concentrated hydrochloric acid. The mixture is refrigerated three hours and the white precipitate collected, washed with water and dried. The product is recrystallized twice from benzenehexane, M.P. 109–111° C.

Calcd. for $C_{15}H_{10}O_4H_{20}$: C, 66.17; H, 4.45. Found: C, 66.27; H, 4.29.

IR (Nujol) 3500 cm.$^{-1}$ (hydroxy); 1755 cm.$^{-1}$(α-lactone); 1655 cm.$^{-1}$ (aryl ketone).

(c) 7-phenyl-1,2,8,9-tetraazaphenalene.—To a solution of 100% hydrazine hydrate (10 ml.) in water (100 ml.) is added 3-hydroxy-7-benzoylphthalide (816 mg.) and the mixture stirred at reflux for 112 hours. At first a white precipitate forms but this gradually changes to a yellow precipitate. The mixture is filtered hot and the yellow precipitate is collected and dried. The crude product (630 mg.) M.P. 289–293°, is recrystallized from ethanol in bright yellow needles, M.P. 292–293°.

Calcd. for $C_{15}H_{10}N_4$: C, 73.15; H, 4.10; N, 22.76. Found: C, 73.30; H, 3.92; N, 22.88.

The material shows a single spot in TLC, fluorescent under u.v. light, $rf=0.63$ (5:1 benzene-DMF).

EXAMPLE 14

5-hydroxy-1,2,8,9-tetraazaphenalene hydrobromide 5-methoxy-1,2,8,9-tetraazaphenalene (2.0 g.) and 48% hydrobromic acid (30 ml.) are stirred at reflux for 5½ hours. At the end of four hours, a clear solution has formed and during the next 1½ hours a yellow solid forms. The mixture is cooled, and the hydrobromide of 5-hydroxy-1,2,8,9-tetraazaphenalene is collected, washed with acetone and dried over phosphorus pentoxide. The product (1.1 g.) does not melt below 340°.

EXAMPLE 15

4-bromo-1,2,8,9-tetraazaphenalene hydrochloride 1,2,8,9-tetraazaphenalene (10 g.) is dissolved in 50% sulfuric acid (200 ml.) and treated with N-bromosuccinimide (12 g.) at room temperature under vigorous stirring. The mixture is stirred on a steam bath for one hour, cooled and poured into cracked ice. The mixture is made alkaline at 0° with 5 N sodium hydroxide. The precipitated solid is collected, washed with water and recrystallized from 6 N hydrochloric acid. The hydrochloride salt of 4-bromo-1,2,8,9-tetraazaphenalene (6.8 g.) is thus obtained as pale yellow crystals which decompose in the range 260–270°. The hydrochloride is decomposed with excess 2 N sodium hydroxide and the free base extracted with chloroform. The chloroform extracts are dried over sodium sulfate, filtered and the solvent evaporated in vacuo. A portion of the residue (800 mg.) is passed through a column of Florisil absorbent (50 g.) with isopropanol as solvent, 100 ml. fractions being taken. Fractions 2, 3 and 4 containing the desired material are combined and concentrated in vacuo and the yellow residue is recrystallized from 6 N hydrochloric acid. The pure yellow crystalline hydrochloride (300 mg.) melts in the range 258–260° with decomposition.

EXAMPLE 16

5-n-butoxy-1,2,8,9-tetraazaphenalene 4-n-butoxy-2,6-bis(dibromomethyl)benzoic acid.—4-n-butoxy-2,6-dimethylbenzoic acid, prepared according to Honkanen, Chem. Abstr. 55, 15400 (1961) (47.2 g.) is dissolved in carbon tetrachloride (200 ml.) and stirred at reflux under illumination with a 250 watt tungsten lamp as bromine (45 ml.) in carbon tetrachloride (300 ml.) is added dropwise. The mixture is stirred at reflux for 4 hours thereafter. The reaction mixture is cooled, partially evaporated in vacuo, and allowed to stand under refrigeration overnight. The white precipitate which forms is collected, washed with carbon tetrachloride and dried over phosphorus pentoxide. The crude product (24.4 g.), M.P. 166–171° is twice recrystallized from benzene and obtained in sparkling white needles, M.P. 187–188°.

Calcd. for $C_{13}H_{14}Br_4O_3$: C, 29.02; H, 2.63; Br, 59.43. Found: C, 29.32; H, 2.40; Br, 59.59.

(b) 5-n-butoxy - 1,2,8,9 - tetraazaphenalene.—A mixture of 4-n-butoxy-2,6-dibromomethylbenzoic acid (27.8 g.), hydrazine hydrate (130 ml.) and water (1300 ml.) is stirred at reflux for 120 hours, filtered and allowed to cool. The pale yellow solid which has formed is collected, washed with water and dried in vacuo. This crude product (1.54 g.) is purified by chromatography over Woelm neutral alumina, grade II (50 g.) with chloroform as solvent. Fractions of 200 ml. are collected and the eluted material checked by thin layer chromatography. Fraction No. 15 contains only pure 5-n-butoxy-1,2,8,9-tetraazaphenalene. The chloroform is evaporated in vacuo and the residue triturated with ethyl acetate. The pale yellow solid obtained on filtration, M.P. 229–237° shows two prominent peaks at 1625 and 1560 cm.$^{-1}$ in the infrared spectrum typical for the tricyclic system and no peaks indicative of a bicyclic phthalazinone in the region 1630–1700 cm.$^{-1}$.

Alternatively this product can be obtained from 3-hydroxy-5-n-butoxy-7-aldehydophthalide in a fashion analogous to that described in Example 1.

EXAMPLE 17

4-chloro-1,2,8,9-tetraazaphenalene 1,2,8,9-tetraazaphenalene (10 g.) is dissolved in 50% sulfuric acid (200 ml.) and treated under vigorous stirring with N-chlorosuccinimide (8.6 g.). The mixture is stirred for one hour on the steam bath, cooled and poured into cracked ice. The mixture is made alkaline at 0° with 5 N sodium hydroxide and the precipitated solid collected, washed with water and dissolved in chloroform. The chloroform extract is dried over sodium sulfate and the solvent removed in vacuo. 4-chloro-1,2,8,9-tetraazaphenalene (7.3 g.) is thus obtained as a yellow solid, melting in the range 260–263°.

EXAMPLE 18

9-benzyl-1,2,8,9-tetraazaphenalene

A suspension of 3.4 g. of 1,2,8,9-tetraazaphenalene is treated with 1.1 g. of sodium methoxide followed by 2.5 ml. of benzylbromide. This mixture is heated at 60° for 3 hours, poured into water and extracted with chloroform The chloroform extracts are dried and evaporated to dryness to yield 9-benzyl-1,2,8,9-tetraazaphenalene.

EXAMPLE 19

1,2,8,9-tetraazaphenalene hydrochloride 1,2,8,9-tetraazaphenalene (170 mg.) is dissolved in warm 6 N hydrochloric acid (20 ml.). The clear yellow solution is evaporated in vacuo. The residue is dissolved in methanol, treated with chloroform and again evaporated in vacuo. The residual solid is triturated with ether containing a little methanol and collected. The crude product (0.3 g.) is recrystallized from a methanol-acetone mixture and obtained as pale yellow crystals, melting in the range 254–257°, resolidfying and recomposing in the range 293–297°.

Calcd. for $C_9H_7N_4Cl$: C, 52.30; H, 3.42; N, 27.12; Cl, 17.17. Found: C, 51.96; H, 3.76; N, 27.14; Cl, 17.12.

In a similar fashion there are obtained the hydrochloride salts of 5-bromo-1,2,8,9-tetraazaphenalene, M.P. above 240° and 4-chloro-1,2,8,9-tetraazaphenalene, M.P. 240–250° C. (dec.).

EXAMPLE 20

1,2,8,9-tetraazaphenalene maleate

To a warm solution of 1,2,8,9-tetraazaphenalene (170 mg.) in ethanol (10 ml.) is added a warm solution of maleic acid (117 mg.) in ethanol (10 ml.). The solution is allowed to react several minutes, and then cooled overnight in the refrigerator. The crude product precipitates in pale yellow needles (189 mg.). This product is recrystallized from ethanol in clusters of yellow needles, M.P. 150–151°.

EXAMPLE 21

1,2,8,9-tetraazaphenalene methanesulfonate

To 1,2,8,9-tetraazaphenalene (5.1 g.) suspended in absolute methanol (125 ml.) is added methanesulfonic acid (5 ml.) dropwise under stirring. This is stirred 20 minutes at about 60° C., cooled and filtered. Addition of ether to the mother liquor yields a second crop of buff solid. The crude material (6.7 g., M.P. 243–258° dec.) is twice recrystallized from dimethylformamide and the pure product (2.95 g., M.P. 288–293° dec.) thus obtained.

Calcd.: C, 45.19; H, 3.79; N, 21.04; S, 12.04. Found: C, 45.08; H, 3.96; N, 20.76; S, 11.96.

In a similar fashion there are prepared the methanesulfonates of 3-phenyl-1,2,8,9-tetraazaphenalene, M.P. 256–257.5° C.; 5-bromo-1,2,8,9-tetraazaphenalene, M.P. 264–268° C.; and 5-methoxy-1,2,8,9-tetraazaphenalene, M.P. 255–257° C.

EXAMPLE 22

1,2,8,9-tetraazaphenalene methiodide

A mixing of 1,2,8,9-tetraazaphenalene (266 mg.) methyl iodide (5 ml.) and dry methanol (24 ml.) is heated under reflux under exclusion of moisture for 23 hours. The yellow solution is evaporated in vacuo to 475 mg. of yellow solid which is recrystallized from methanol, M.P. 268–269°.

*Analysis.*—Calcd. for $C_{10}H_9N_4I$: C, 38.48; H, 2.91; N, 17.95; I, 40.66. Found: C, 38.71; H, 2.70; N, 17.69; I, 40.62.

Similarly the use of ethyl iodide and 2-iodopropane yields the corresponding ethiodide, M.P. 260–262° and isopropiodide, M.P. 256–256°.

Treatment of 9-methyl-1,2,8,9-tetraazaphenalene with methyl iodide similarly yields the corresponding methiodide, M.P. 207–208.5°.

EXAMPLE 23

9-methyl-1,2,8,9-tetraazaphenalene hydriodide 9-methyl-1,2,8,9-tetraazaphenalene is dissolved in 47% hydriodic acid at room temperature and the solution is evaporated in vacuo to a yellow solid. The solid is triturated with ethanol, washed with ether and dried. The product melts with decomposition in the range 247–248°.

What is claimed is:

1. A compound of the formula:

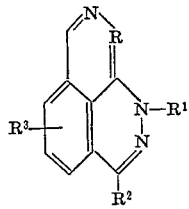

wherein
$R^1$ is hydrogen, (lower)alkyl, phenyl or phenylalkyl;
$R^2$ is hydrogen or phenyl; and
$R^3$ is hydrogen, chloro, bromo, hydroxy, alkoxy, carboxy or nitro.

2. The acid addition salts of a compound according to claim 1.

3. A compound according to claim 1 having the formula:

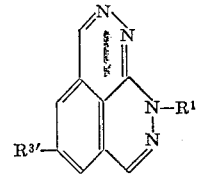

wherein $R^{3\prime}$ is hydrogen, hydroxy or alkoxy.

4. The acid addition salts of a compound according to claim 3.

5. The compound according to claim 1 wherein said compound is 1,2,8,9-tetraazaphenalene.

6. The compound according to claim 1 wherein said compound is 5-methoxy-1,2,8,9-tetraazaphenalene.

7. The compound according to claim 1 wherein said compound is 5-bromo-1,2,8,9-tetraazaphenalene.

8. The compound according to claim 1 wherein said compound is 4,6-dinitro-1,2,8,9-tetraazaphenalene.

9. The compound according to claim 1 wherein said compound is 5-n-butoxy-1,2,8,9-tetraazaphenalene.

10. The compound according to claim 1 wherein said compound is 5-hydroxy-1,2,8,9-tetraazaphenalene.

11. The compound according to claim 1 wherein said compound is 4-bromo-1,2,8,9-tetraazaphenalene.

12. The compound according to claim 1 wherein said compound is 4-chloro-1,2,8,9-tetraazaphenalene.

13. The compound according to claim 1 wherein said compound is 9-methyl-1,2,8,9-tetraazaphenalene.

14. The compound according to claim 1 wherein said compound is 9-phenyl-1,2,8,9-tetraazaphenalene.

15. The compound according to claim 1 wherein said compound is 7-phenyl-1,2,8,9-tetraazaphenalene.

No references cited.

NICHOLAS S. RIZZO, *Primary Examiner.*

U.S. Cl. X.R.
260—343.3, 999

UNITED STATES PATENT OFFICE
CERTIFICATE OF CORRECTION

Patent No. 3,429,882                                                      February 25, 1969

Karl J. Doebel et al.

It is certified that error appears in the above identified patent and that said Letters Patent are hereby corrected as shown below:

Column 1, line 24, "Serial Nos. 583,380, 539,305" should read -- Serial Nos. 583,980, 539,303 --; lines 35 to 40, the formula should appear as shown below:

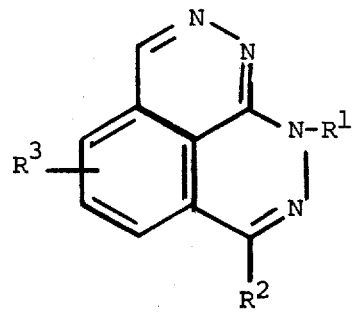

Column 3, lines 50 to 60, the formula should appear as shown below:

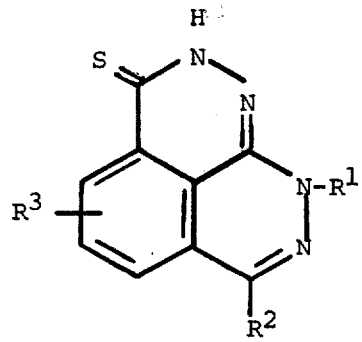

Column 4, lines 5 to 10, the formula should appear as shown below:

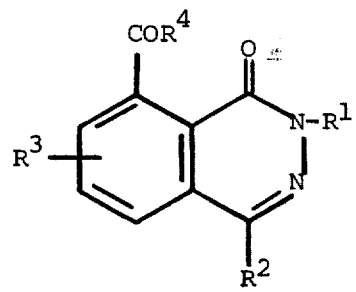

3,429,882

(2)

same column 4, line 63, "hydrazine" should read -- hydrazino --. Column 6, line 11, "anhydric" should read -- anhydride --; line 25, "the" should read -- two --; line 26, "93-" should read -- 93-95° C. --. Column 7, line 36, "1,3-dihydro" should read -- 2,3-dihydro --. Column 9, line 1, "N 19.52" should read -- N 10.52 --; line 49, "$C_{15}H_{19}ClN_4$" should read -- $C_{15}H_9ClN_4$ --. Column 10, line 61, "300 ml" should read -- 30 ml --. Column 11, line 74, "4,6,1-dinitro" should read -- 4,6-dinitro --. Column 12, line 22, "(protons at $C_2$, $C_7$)" should read -- (protons at $C_3$, $C_7$) --; line 25, "H 180" should read -- H 1.80 --. Column 13, line 44, "(200 ml)" should read -- (2000 ml) --. Column 14, line 39, "recomposing" should read -- decomposing --. Column 15, lines 30 to 38, the formula should appear as shown below:

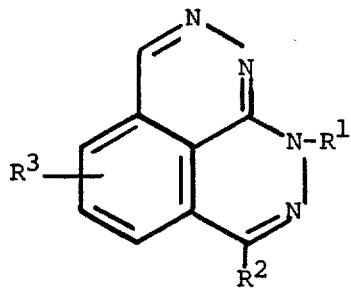

Signed and sealed this 14th day of April 1970.

(SEAL)
Attest:

EDWARD M. FLETCHER, JR.
Attesting Officer

WILLIAM E. SCHUYLER, JR.
Commissioner of Patents